June 8, 1954  J. DICKSON  2,680,494
ENGINE LUBRICATION SYSTEM
Filed April 22, 1950
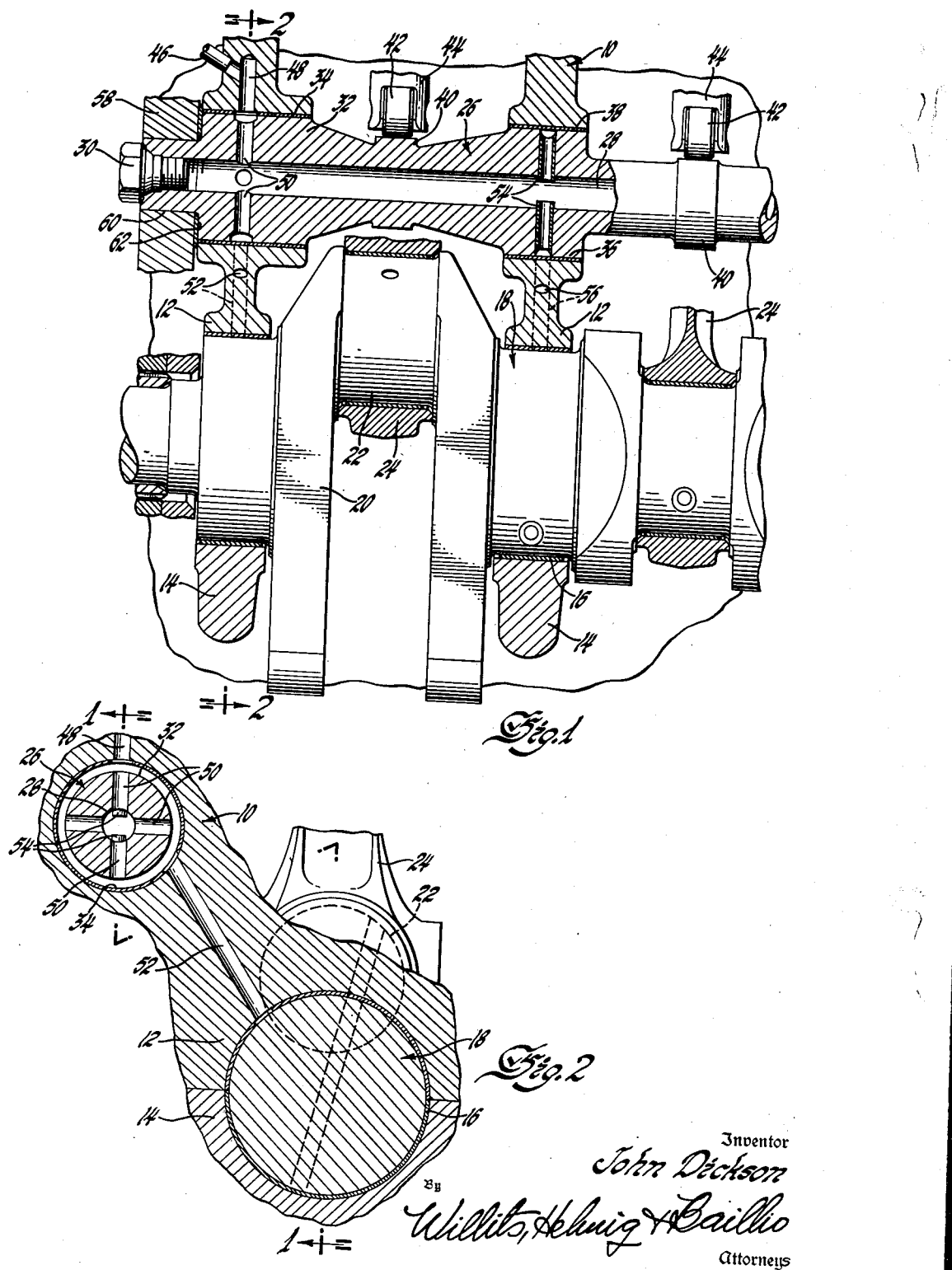
Inventor
John Dickson
By Willits, Helmig & Baillio
Attorneys Patented June 8, 1954

2,680,494

UNITED STATES PATENT OFFICE 2,680,494

ENGINE LUBRICATION SYSTEM

John Dickson, Huntington Woods, Mich., assignor to General Motors Corporation, Detroit, Mich., a corporation of Delaware Application April 22, 1950, Serial No. 157,613

1 Claim. (Cl. 184—6)

This invention relates to an improved lubrication system for a power plant which continuously cleans the oil during the operation of the power plant.

The primary object of this invention is to provide sediment chamber in a hollow rotating shaft in power plant to separate and remove impurities of a heavy nature from the oil as it flows through the hollow shaft to be distributed to various points in the power plant.

Another object of this invention is to provide in a hollow cam shaft of an internal combustion engine a plurality of oil feed ducts extending within the hollow shaft to provide chambers wherein the heavy impurities may be separated from the oil when the shaft is rotated during the operation of the engine.

Another object of the invention is to provide an internal combustion engine having a hollow shaft having a cavity or separation chamber through which the oil flows and where the heavy impurities in the oil are deposited and the hollow shaft forming a portion of the oil distribution system of the engine.

These and other objects of the invention are illustrated and described in the accompanying drawing and specification.

In the drawing:

Figure 1 is a partial section of an engine with parts broken away and in section.

Figure 2 is a partial section of an engine on the line 2—2 of Figure 1.

The invention provides an oil purifying system for a power plant and utilizes a hollow shaft in the power plant both as an oil distributing passage and an oil purifying device. The shaft has a large hollow passage through the center with an inlet duct at one end and with outlet ducts located along the length of the shaft. The outlet ducts have an entrance portion located nearer the center of the shaft than the inner wall portion of the hollow shaft in order to provide a dirt collecting cavity or chamber in the hollow portion of the shaft. The oil is distributed from the outlet ducts to the bearings which support the shaft and to the lubrication system of the power plant to lubricate any element such as the main bearings.

The invention is illustrated in Figure 1 in connection with an internal combustion engine having a block 10. Only the lower portion of the block 10 is illustrated and this portion has a main shaft bearing supporting portion 12 at the lower end and a semi-circular bearing cap 14 bolted thereto. A shell type bearing 16 is located within the bearing support 12 and the cap 14 in order to rotatably support the main crank shaft 18. The crank shaft 18 is a conventional structure and has counterbalanced crank throws 20 supporting a crank 22 which drives the connecting rod 24. The crank shaft and connecting rod may have suitable bores drilled therein to lubricate the connecting rod bearing and the wrist pin in accordance with accepted practice.

Located above and to the left of the main shaft 18 is a hollow cam shaft 26. The cam shaft 26 has a straight passage 28 through the center to conduct oil to the bearings. For convenience in manufacturing, the passage 28 extends completely through the cam shaft and is sealed at the ends by suitable means such as plug 30. The cam shaft has an integral journal portion 32 which is rotatably mounted in the bearing shell 34 which is located in the block 10. The cam shaft is also provided with other journal portions 36 located along the length of the shaft and rotatably mounted in the bearing shells 38 which are suitably fixed in the block 10. The cams 40 which engage the rollers 42 on the end of the tappet rods 44 are also integrally formed on the cam shaft 26 between the journals.

The oil from the lubrication pump (not shown) enters the engine lubricating system through the supply passage 46 located at the top of bearing 34. The oil flows through supply passage 46 and the bearing passage 48 to supply the bearing 34. The oil lubricates the bearing 34 and flows through the radial inlet ducts or passages 50 in the cam shaft 26 to the distribution passage 28. It is also pointed out that the oil may flow out of bearing 34 at the bottom into connecting passage 52 to supply oil to the end bearing 16. The oil which enters the distribution passage 28 through the inlet passages 50 flows to the right toward bearing 38. As the oil flows through the rotating distribution passage 28, the impurities are separated due to the centrifugal action. The heavier impurities are thus forced outward against the internal wall of passage 28 and are collected in the cavity or separation chamber in the passage 28 and located radially outward from the entrance to duct 54. At each of the bearings such as cam shaft bearing 38, radial outlet ducts 54 are provided to supply oil to the bearing and to other parts of the engine. As illustrated in Figure 1 the radial outlet ducts 54 are separate ducts inserted in apertures in the cam shaft 26. The ducts 54 extend nearer the center of the shaft than the wall of the passage 28 in order to provide a cavity or settling chamber for the impurities in the oil at a greater radial distance from the center or axis of the shaft 26 than the entrance opening of the outlet ducts 54.

The oil is thus cleaned and flows out to the bearing 38. A lubrication passage 56 connects bearing 36 and the main shaft bearing 16 so that the main bearing will be lubricated with the purified oil. Since the main shaft is generally drilled, the connecting rod bearings will be lubricated. If the rod is drilled, the wrist pin will also be lubricated by oil supplied through the purifying cam shaft. The passage 56 may also be connected with any other lubricating passage to lubricate any other portion of the engine. It is particularly feasible to connect the oil spray nozzle commonly used with the diesel engines to lubricate and cool the cylinder walls and the wrist pin to this passage 56. The cam shaft is held in the proper longitudinal position by means of an abutment member 58 which has a suitable aperture 60 fitting over and engaging a shoulder 62 on the end of the cam shaft 26.

The internal combustion engine illustrated in this invention shows how the oil which is supplied by a conventional lubricating oil pump through a passage 46 is conducted to an interior distributing passage in the cam shaft. As the oil flows through the passage 28 in the cam shaft so that it will be distributed to each of the bearings in the engine, it is also purified by the rotary action of the cam shaft. Due to the rotary action, the body of oil in the shaft is rotated and the heavy impurities in the oil are thrown radially outward. Thus, the major portion of the heavy impurities will be separated and positioned against the internal wall of cam shaft 26 and the pure oil will be located in the central region of the passage 28. Since the outlet ducts 54 have the entrance portion adjacent the center of passage 28 as best shown in Figure 1, the purer portion of the oil will be conducted by ducts 54 out through the wall of shaft 26 to the bearings. The impurities will remain trapped within the hollow portion 28 located radially outward from the entrance of outlet ducts 54. The passage 28 thus provides a cavity or separation chamber at a greater distance from the axis of the shaft than the entrance to the outlet ducts 54 in order to trap the impurities in the oil. The clean oil will then flow out through the duct 54 to the bearing 36 and may be conducted from this bearing to any other bearing by suitable passages such as the passage 56 which conducts oil to the bearing 16. If the main shaft and connecting rods are drilled, the oil may flow to lubricate the connecting rod bearing and wrist pin bearing.

The above description and drawing is illustrative of a specific embodiment of the invention. It is apparent that numerous modifications may be made within the scope of the appended claim by those skilled in the art.

I claim:

In an internal combustion engine, a pressure lubricating system for said engine having a source of oil under pressure, a main crank shaft rotatably mounted in a plurality of main shaft bearings, a cam shaft having a plurality of bearing portions on the outer surface rotatably mounted in a plurality of cam shaft bearings in said engine, a cam shaft bearing passage extending completely through said cam shaft bearing from the outside surface to the internal bearing surface, said cam shaft having a central passage, an annular groove centrally located in each of said bearing portions in radial alignment with said cam shaft bearing passage, a supply passage connecting said source of said pressure lubrication system to said cam shaft bearing passage at the outside surface of one of said cam shaft bearings, an inlet duct in said cam shaft connecting the annular groove in the outer surface of the shaft in said one bearing to the surface of the central passage to supply oil to the central passage, an outlet duct in said cam shaft connecting the central passage to the annular groove in the outer surface of the shaft in the other bearing, said outlet duct extending inwardly of the wall of said central passage to a point adjacent the center of the passage to provide a settling chamber in said passage to collect the impurities in the oil, and main bearing lubricating passages extending from the internal surface of said cam shaft bearings facing said annular grooves and connecting the cam shaft bearings to the main shaft bearings.

References Cited in the file of this patent

UNITED STATES PATENTS

| Number | Name | Date |
| --- | --- | --- |
| 1,418,408 | Vincent | June 6, 1922 |
| 1,497,503 | Greuter | June 10, 1924 |
| 1,634,123 | Taub | June 28, 1927 |
| 1,674,191 | Chilton | June 19, 1928 |
| 1,916,522 | McCuen | July 4, 1933 |